Aug. 15, 1933.                H. D. LATHROP                1,922,772
                        COVER LOOSENING MECHANISM
                    Filed June 20, 1930      3 Sheets-Sheet 1
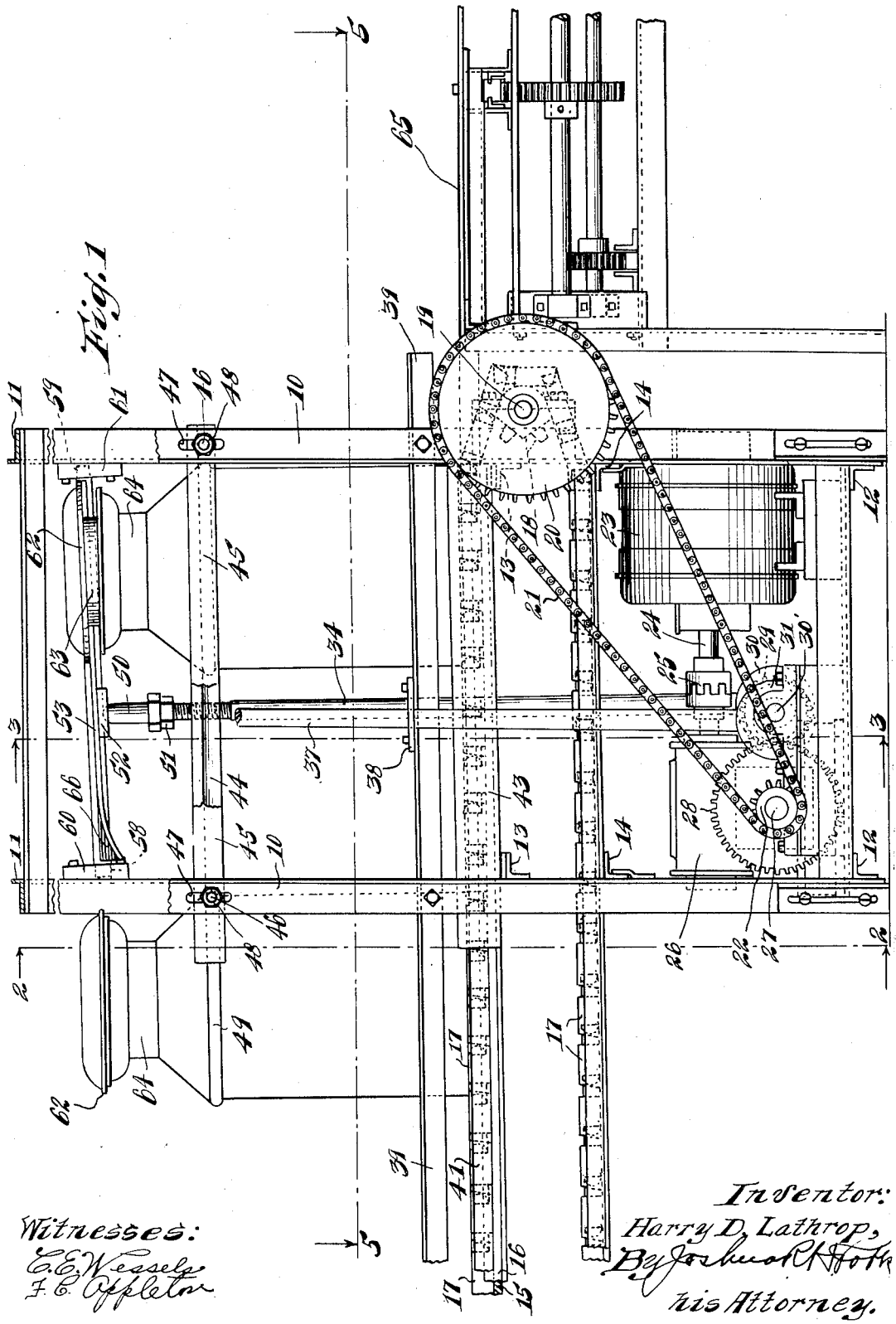
Witnesses:
Inventor:
Harry D. Lathrop,
his Attorney.

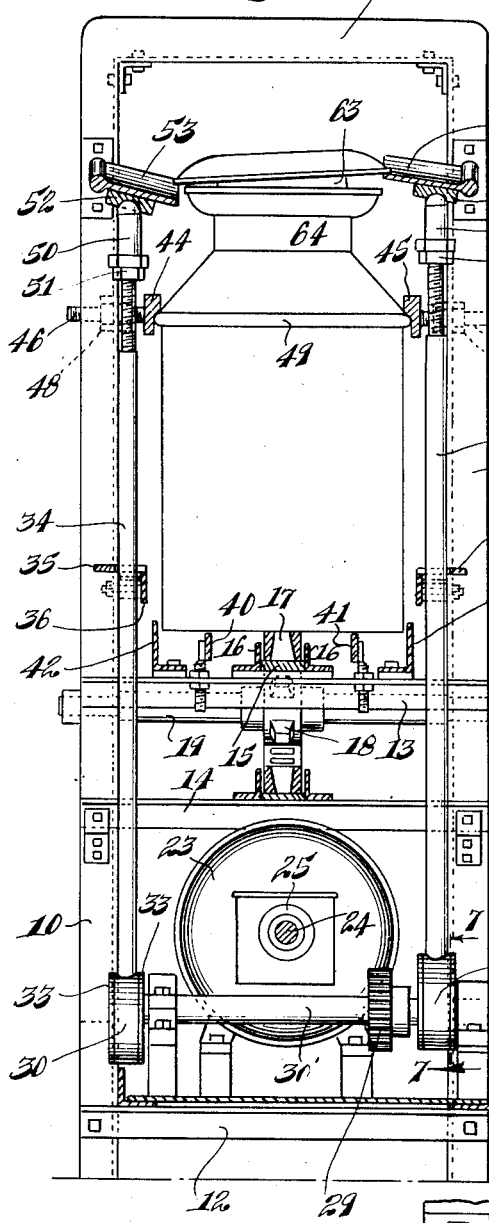
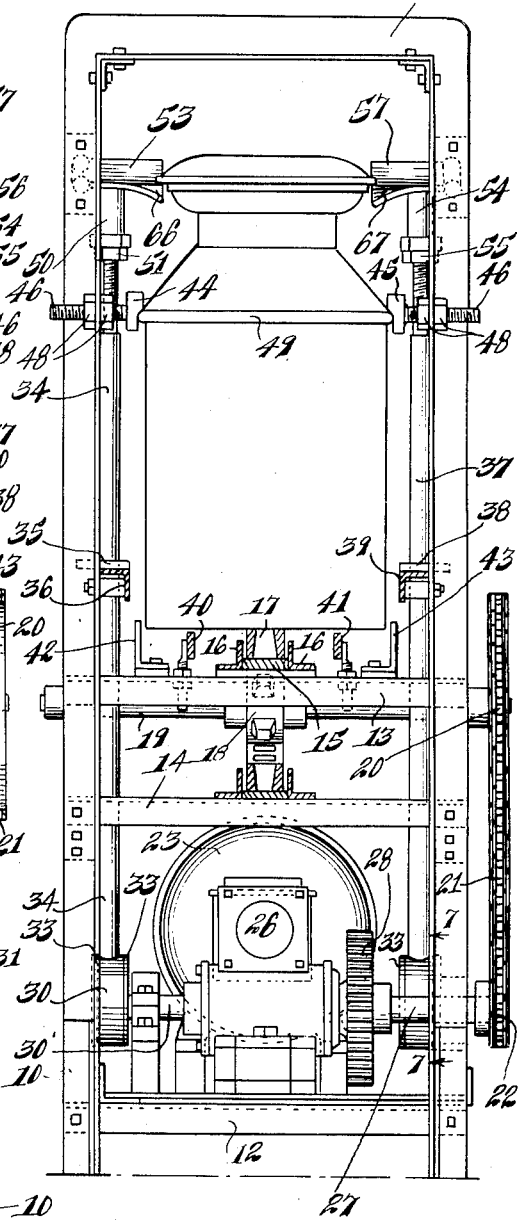
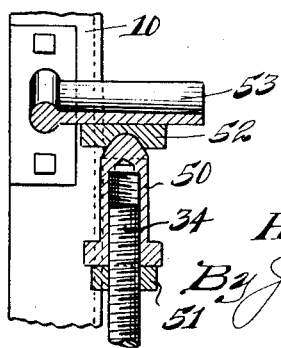

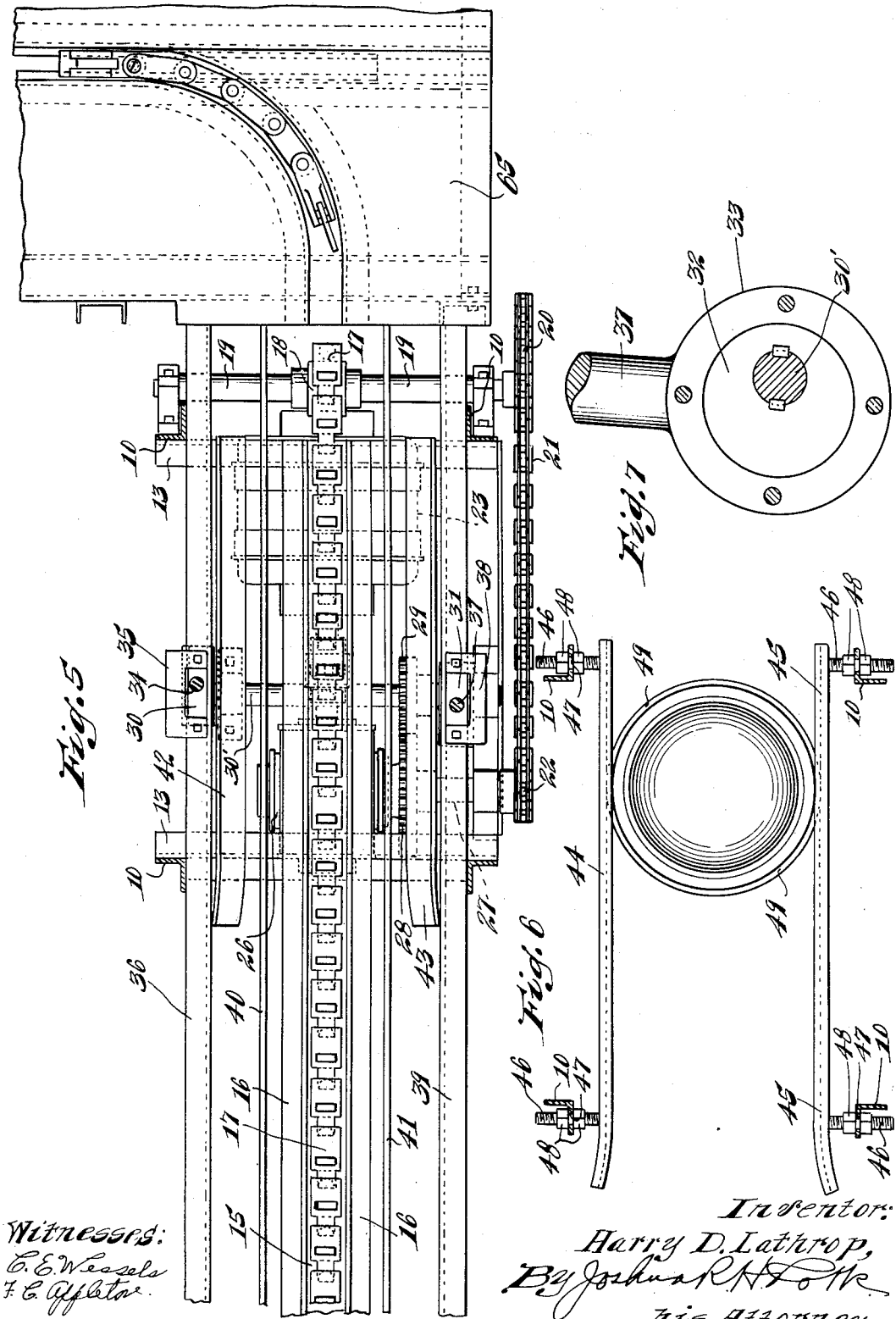

Patented Aug. 15, 1933

1,922,772

UNITED STATES PATENT OFFICE 1,922,772

COVER LOOSENING MECHANISM

Harry D. Lathrop, Chicago, Ill.

Application June 20, 1930. Serial No. 462,689

9 Claims. (Cl. 29—84)

This invention relates to cover loosening mechanism, and particularly to mechanism or an apparatus for loosening the covers of receptacles to facilitate the removal of the covers. The invention is particularly adapted for use in association with a can washing machine as shown, in connection with which the covers of cans containing milk or cream, for example, are frictionally held in place and in many instances delay and considerable effort are encountered in removing covers preparatory to inspection and discharge of the contents. An object of the invention, therefore, is the provision of improved mechanism of the character indicated adapted to effectively loosen the cover of a receptacle from its engagement therewith so that the cover will lightly rest in place. A more specific object is the provision of improved mechanism for loosening milk can covers in cooperative association with a can conveyor whereby the covers will be automatically loosened through their progress upon the conveyor in readiness for subsequent inspection of contents, dumping of the contents, and introduction of the can and cover into a milk can washing machine.

Other objects will appear hereinafter.

The invention consists in the combinations and arrangements of parts hereinafter described and claimed.

The invention will be best understood by reference to the accompanying drawings, forming a part of this specification, and in which:

Fig. 1 is a side elevational view of an apparatus embodying the invention;

Fig. 2 is a vertical sectional view, taken substantially on the line 2—2 of Fig. 1;

Fig. 3 is a vertical sectional view, taken substantially on the line 3—3 of Fig. 1;

Fig. 4 is a detail sectional view of the left-hand oscillating plate and actuating head shown in Fig. 3;

Fig. 5 is a horizontal sectional view, taken substantially on the line 5—5 of Fig. 1, with the milk cans omitted;

Fig. 6 is a plan view of the can guide bars in operative position; and

Fig. 7 is a sectional view of one of the eccentric members, taken substantially on the line 7—7 of Fig. 2.

As illustrated in the drawings, the preferred embodiment of the apparatus comprises vertically extending parallel standards 10 which may be bent to form upper cross members 11, as shown, and having lower transverse brace members 12 and intermediate brace members 13 and 14. A longitudinally extending plate 15 is preferably disposed upon the bracing supports 13 between two angle members 16 so as to provide a channel for the upper run of an endless conveyor chain 17. Chain 17 is preferably of the smooth surface type and is adapted in normal operation to travel continuously around sprocket 18 affixed to shaft 19, which is suitably journaled adjacent the forward end of the apparatus as shown, and which carries drive sprocket 20 for engagement by drive chain 21 which travels over sprocket pinion 22. The drive connection for the conveyor chain 17 and the remaining mechanism employed in the preferred embodiment shown comprises motor 23 having drive shaft 24 connected through flexible coupling 25 to the gear reduction assembly 26, from which extends shaft 27 upon which is keyed sprocket pinion 22 for driving the conveyor chain 17, and gear 28 is also secured to shaft 27 and is adapted to engage gear 29 mounted upon transverse shaft 30'.

Mounted adjacent opposite ends of transverse shaft 30' are two eccentric members 30 and 31, respectively, each having an eccentric disc 32 engaged by a suitable eccentric strap held in place by washers 33, as shown in Fig. 7. Eccentrics 30 and 31 are preferably offset relative to each other at 180 degrees, and the strap of eccentric 30 is secured to vertically extending rod 34 slidably guided by reason of extension through plate 35 mounted upon lateral guard rail 36, and similarly, the oppositely disposed rod 37 extends through a suitable opening in plate 38 secured to the opposite guard rail 39.

Extending longitudinally of the machine in parallel relation and disposed upon either side of the conveyor chain channel, are rails 40 and 41 which, as shown, are disposed slightly below the upper surface of chain 17 so as to support a can in case it should tilt in either direction. Also, adjacent the present mechanism, there is preferably provided auxiliary angle guides 42 and 43 with the can approach ends flared outwardly as shown in Fig. 5. Extending in parallel relation interiorly of the framework described, are two oppositely disposed can guide bars 44 and 45 which are adjustable for different elevations by means of bolts 46 which extend through corresponding slots 47 and are held in place by nuts 48. As shown in Figs. 2 and 3, each guide bar 44 and 45 has a cutaway recessed portion along the lower edge of the inner surface whereby as the can is propelled by the conveyor chain 17 these portions will engage shoulder 49 of the can and maintain the can in proper position in its travel for operation by the cover loosening devices next described.

Threaded upon the upper extremity of rod 34 is an actuating head 50 maintained in selected adjusted position by lock nut 51 and adapted to be disposed within a socket on the under surface of block 52 which is secured to oscillating plate 53. Similarly threaded on rod 37 is a corresponding head 54 maintained by lock nut 55 and adapted to seat in a socket on the under surface of block 56 secured to oscillating plate 57. Plates 53 and 57 incline upwardly toward the delivery end of the machine, as shown in Fig. 1, and each is provided adjacent the opposite ends and the outer edge with trunnions 58 and 59 journaled in blocks 60 and 61, respectively, as shown in Fig. 1. The can covers generally employed are provided with an annular ridge 62 and a depending cylindrical portion 63 which is adapted to snugly fit within the can neck 64. Provided at the discharge end of the machine after the covers have been loosened, is a receiving platform 65 upon which the cans are deposited.

As shown in Fig. 2, plate 53 preferably has a downwardly flared portion 66 at the point of initial engagement, and plate 57 has a corresponding flared portion 67. As the conveyor chain 17 operates, the cans are continuously and successively fed through the machine and as a can approaches the cover loosening mechanism of the present invention, annular ridge 62 of the cover which normally projects a slight distance beyond the adjacent portion of the can, is engaged by the inner edge portions of the oscillating plates 53 and 57. As the travel of the can continues, plates 53 and 57 continue to oscillate alternately, and the cover is gradually loosened. This action and operation are enhanced by the upper inclined arrangement of the oscillating plates described in such manner that when the can has passed the plates at the discharge end of the machine, the cover is entirely loosened and merely rests in place by its own weight for ready removal by the operator for inspection and dumping of the contents. During the cover loosening operation, the can is guided and maintained in proper relative position by means of the guide bars 44 and 45. The rocking travel of the oscillating plates is merely sufficient to insure that the cover will be loosened adequately when the plates have been passed, and thus the upward travel may be readily adjusted by means of the threaded heads 50 and 54. The ball and socket engagement of these heads with the associated socket blocks has been found ample to maintain the parts in operative engagement, and especially efficient for the purpose.

While I have illustrated and described the preferred form of construction for carrying my invention into effect, this is capable of variations and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. Cover loosening mechanism for loosening covers of receptacles, comprising a pair of oscillatory members constructed and arranged to engage a cover at different points on the periphery thereof, means for actuating said oscillatory members, and guide means for retaining a receptacle in position during operation of said oscillatory members.

2. Cover loosening mechanism for loosening covers of receptacles, comprising a pair of oscillatory members constructed and arranged to engage a cover at different points on the periphery thereof, means for actuating said oscillatory members in alternate relationship, and guide means for retaining a receptacle in position during operation of said oscillatory members.

3. Cover loosening mechanism for loosening covers of receptacles, comprising a receptacle conveyor, a pair of oscillatory members constructed and arranged to engage a cover at different points on the periphery thereof during travel of a receptacle on said conveyor, means for actuating said oscillatory members, and guide means for retaining a receptacle in position during operation of said oscillatory members.

4. Cover loosening mechanism for loosening covers of receptacles, comprising a receptacle conveyor, a pair of oscillatory members constructed and arranged to engage a cover at different points on the periphery thereof during travel of a receptacle on said conveyor, means for actuating said oscillatory members in alternate relationship, and guide means for retaining a receptacle in position during operation of said oscillatory members.

5. Cover loosening mechanism for loosening covers of receptacles, comprising a receptacle conveyor, a pair of oscillatory members constructed and arranged to engage a cover at different points on the periphery thereof during travel of a receptacle on said conveyor, and means for actuating said oscillatory members, said oscillatory members inclined upwardly in the direction of travel of said conveyor.

6. Cover loosening mechanism for loosening covers of receptacles, comprising a receptacle conveyor, a pair of oscillatory members constructed and arranged to engage a cover at different points on the periphery thereof during travel of a receptacle on said conveyor, means for actuating said oscillatory members, and guide means for retaining a receptacle in position during operation of said oscillatory members, said oscillatory members inclined upwardly in the direction of travel of said conveyor.

7. Cover loosening mechanism for loosening covers of receptacles, comprising a receptacle conveyor, a pair of oscillatory members constructed and arranged to engage a cover at different points on the periphery thereof during travel of a receptacle on said conveyor, and means for actuating said oscillatory members in alternate relationship, said oscillatory members inclined upwardly in the direction of travel of said conveyor.

8. Cover loosening mechanism for loosening covers of receptacles, comprising a receptacle conveyor, a pair of oscillatory members constructed and arranged to engage a cover at different points on the periphery thereof during travel of a receptacle on said conveyor, means for actuating said oscillatory members in alternate relationship, and guide means for retaining a receptacle in position during operation of said oscillatory members, said oscillatory members inclined upwardly in the direction of travel of said conveyor.

9. Cover loosening mechanism for loosening covers of receptacles, comprising a support for the receptacle, a plurality of loosening members engaging the cover at different points on the periphery thereof and constructed and arranged for movement from and toward said support, and means for actuating said loosening members.

HARRY D. LATHROP.